INVENTOR,
OTTO E. RITTENBACH.

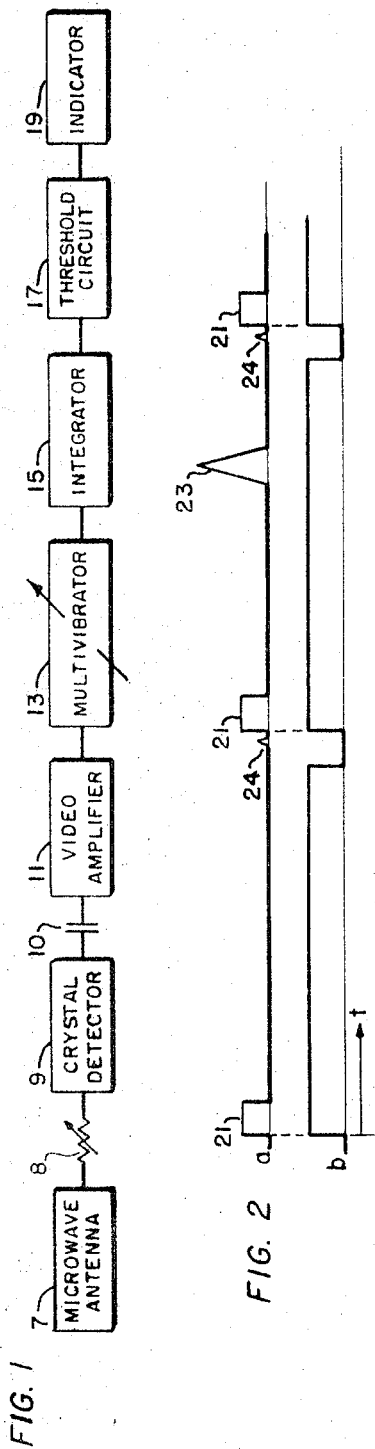

United States Patent Office 3,465,253
Patented Sept. 2, 1969

3,465,253
PULSED AND CONTINUOUS WAVE ELECTROMAGNETIC SIGNAL DETECTORS
Otto E. Rittenbach, Neptune, N.J., assignor to the United States of America as represented by the Secretary of the Army
Filed Feb. 9, 1967, Ser. No. 615,034
Int. Cl. H04b *1/06, 1/10, 1/16*
U.S. Cl. 325—322　　　　　　　　　　　　　　　　7 Claims

ABSTRACT OF THE DISCLOSURE

Three signal detectors are shown which are intended to detect the presence of microwave signals such as radar signals. The circuitry comprises basically untuned crystal-video receivers combined with various means to discriminate against random noise and to enhance the response to pulsed radar signals of known or estimated characteristics. One circuit is primarily intended to detect pulsed microwave signals, another continuous wave signals and a third will efficiently detect either type of signal.

This invention relates to electromagnetic signal detectors adapted to indicate the presence of radar signals. The detection of enemy radar signals by the apparatus herein disclosed permits troops to take evasive action or to initiate electronic countermeasures. Each of the disclosed embodiments of the invention comprises basically a crystal-video radar receiver combiner with circuitry for increasing the sensitivity thereof, for discriminating against noise and for enhancing the response of the detector to radar signals of known or estimated characteristics. The crystal-video receiver is an inherently broad-band device with no tuned circuits therein and can respond to a wide range of carrier frequencies. Since crystal-video receivers are necessarily noisy, the noise-reducing features of this invention are particularly important for reducing the number of false alarms caused by noise.

It is therefore an object of this invention to provide a novel and useful radar signal detector and indicator.

Another object of this invention is to provide an uncomplicated, wideband microwave receiver adapted to detect the presence of radar signals and to discriminate against noise.

These and other objects and advantages of the present invention will become apparent from the following detailed description and drawings, in which:

FIGURE 1 is a block diagram of an electromagnetic signal detector adapted to detect pulsed signals.

FIGURE 2 illustrates waveforms in different parts of the circuit of FIGURE 1.

FIGURE 3 is a diagram of a detector adapted to detect continuous wave electromagnetic signals in the radar or microwave region.

Figure 4:
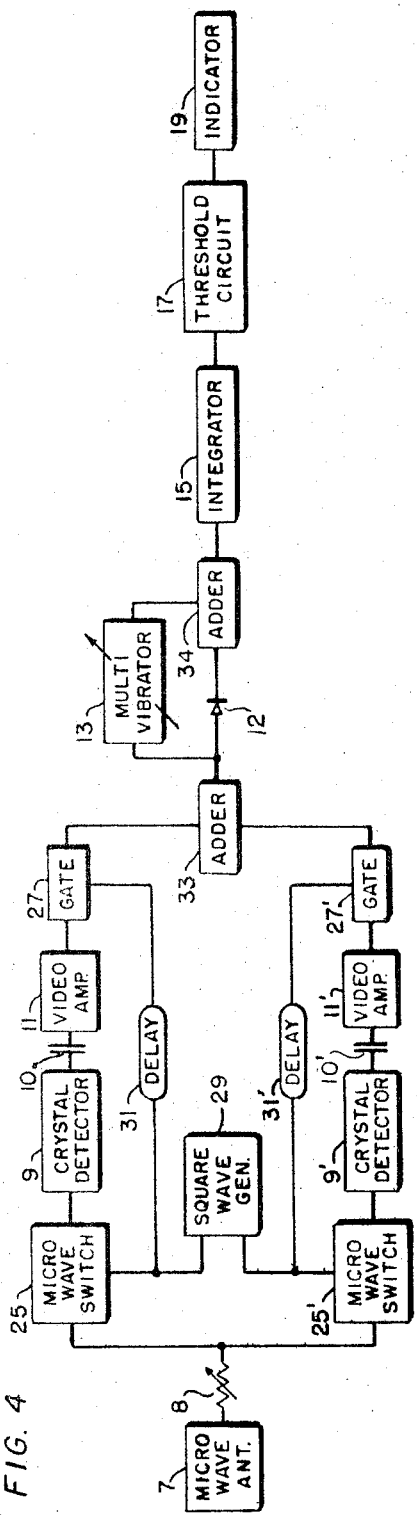
FIGURE 4 is a block diagram of a circuit which can detect either pulsed or continuous wave radar signals.

In FIGURE 1 the circuitry shown includes a microwave antenna 7, the output of which is applied to crystal detector 9 via adjustable attenuator 8. The resulting video pulse train at the output of detector 9 is applied to video amplifier 11 via DC blocking capacitor 10. The output of amplifier 11 triggers the monostable (or one-shot) multivibrator 13. The output of the multivibrator is applied to integrator 15, thence to threshold circuit 17 and finally to indicator (or alarm) 19. The antenna 7 may simply be a horn or a broadband dipole or, if increased directivity is desired, a parabolic reflector combined with a horn or dipole at the focus thereof. If omnidirectivity is desired the dipole can be vertically mounted with no reflector. The crystal detector or demodulator 9 may be simply a semiconductor diode mounted in the waveguide which extends from the antenna. The bandwidth of such a device will be broad, being limited only by the transmission characteristics of the horn and waveguide. Any continuous wave signals picked up by the antenna will produce DC output from detector 9 which will be blocked by capacitor 10. Pulsed signals will produce a video pulse train which will be applied to video amplifier 11 via capacitor 10. The monostable multivibrator 13 is a pulse generator which will be triggered by each pulse in the output of the video amplifier which has sufficient amplitude to do so. The RC time constant of the multivibrator 13 can be varied to provide an output pulse of controllable length, as indicated by the arrow through this block. This feature can provide a measure of noise discrimination if the pulse repetition frequency of the radar signal to be detected is known or can be estimated. The pulse length of the multivibrator is adjusted to slightly less than the interpulse period of the signal to be detected. Thus the output of the multivibrator almost fills in the entire time interval between pulses. Since a monostable multivibrator cannot be triggered or affected in any way while in its astable state, any noise pulses which reach its input while in such state will not contribute to its output. This feature of the circuit is illustrated in FIGURE 2 in which the waveform *a* shows the output of video amplifier 11, including three video radar pulses 21, one large noise pulse 23 and two small noise pulses 24. The output of multivibrator 13 is shown in waveform *b* if its input is that of waveform *a*. The first radar pulse triggers the multivibrator which produces a pulse almost as long as the interpulse period of the radar signal. Any noise pulses of any amplitude, such as 23, which occur during the multivibrator pulse will not contribute to its output. Thus large noise pulses such as 23 which may otherwise swamp or mask the desired radar signal 21 are completely eliminated. Further, any small pulses such as 24 which occur after the multivibrator pulse ends but before the next radar pulse 21 appears, and in addition are too small to trigger the multivibrator, will also be eliminated. The output of the multivibrator is applied to the integrator 15, which may comprise simply an RC type low-pass filter. Whenever the voltage of the integrator builds up to the threshold or triggering voltage of the threshold circuit 17, the indicator, which may be an audible, visible or tactile type alarm, will be actuated. The integrator and threshold circuit are designed to further discriminate against any noise signals which may trigger the multivibrator. Thus the circuit can be arranged so that the voltage buildup on the integrator is related to the threshold level of 15 that a given number of closely spaced pulses from the multivibrator are required before threshold level is reached. For example, the circuit may be designed so that a minimum of one hundred pulses in rapid succession are required to build the integrator voltage up to the threshold level of 17. This prevents random noise pulses from operating the indicator if no radar pulses are present. The circuitry of the threshold circuit may comprise merely a back-biased diode or a relay. In the latter case the pull-in voltage of the relay would be the threshold voltage and the indicator would be actuated by the relay contacts. The attenuator 8 in FIGURE 1 is useful in case more than one pulsed radar signal is picked up by the circuitry. The attenuator can be adjusted so that only the strongest of the incoming signals will trigger the multivibrator.

Also, he multivibrator can be used to estimate the pulse repetition frequency (PRF) of an incoming signal, in the following manner. Assume that the circuit is designed so that the integrator requires multivibrator pulses of at least 80% duty cycle in order to trigger the threshold circuit. If the multivibrator is then initially set at its minimum pulse length and then increased, when the pulse length and the PRF of the incoming signal are such that the multivibrator pulses fill 80% of the time between radar pulses, the indicator will be triggered. If the multivibrator pulse length is then increased beyond the time interval between radar pulses, the multivibrator will be triggered only on every other incoming pulse and the resulting decrease in duty cycle or energy output of the multivibrator will cause the integrator voltage to fall below the threshold of circuit 17, thus shutting off the indicator.

In the embodiment of FIGURE 3, circuit elements which perform the same function as those of FIGURE 1 have been given the same reference characters. The output of the antenna 7 is periodically switched between two channels. One channel comprises microwave switch 25, crystal detector 9, video amplifier 11, and gate 27 and the second channel comprises microwave switch 25′, crystal detector 9′, video amplifier 11′, and gate 27′. The push-pull square wave generator 29 alternately opens the microwave switches 25 and 25′ so that any continuous wave signals picked up by the antenna will be chopped at the frequency of generator 29, with the antenna signal alternating between the two channels. When the signal is passing through one channel, the other channel is cut off by means of its microwave switch. The oppositely phased outputs of the generator 29 are applied to the microwave switches 25 and 25′ over leads 35 and 37, respectively. The microwave switches may comprise small crystal diodes which are biased into conduction by the generator 29 to short out or reflect the microwave signal in the waveguide in which the diodes are mounted, or electromechanical switches may be used for the purpose. In each of the channels the crystal detectors remove the carrier frequency, leaving video pulse trains of 50% duty cycle with a polarity dependent on the polarity of the detector diode. In the illustrated embodiments, positive video pulse trains are shown. The transmission gates 27 and 27′ are opened by the outputs of the square wave generator 29 in synchronism with the operation of the microwave switch of the same channel. Thus when the output of the video amplifier 11 is positive the gate 27 of the first channel will be opened by the output 35 of generator 29 to pass the positive video pulse to the adder 33 and at the same time the output 37 of the generator 29 will be of such polarity or amplitude (for example zero voltage), that the microwave switch 25′ and the gate 27′ would both be closed. During the next half cycle of the generator 29, the situation would be reversed with the upper or first channel blocked and the lower one providing a positive output to adder 33. The delay lines 31 and 31′ delay the gating signals from the generator 29 so that they arrive at the gates 27 and 27′ at the same time as the video signals in the two channels. The gates 27 and 27′, when closed, block noise which may leak through the microwave switches and also any noise generated by the crystal detectors or the video amplifiers. The adder 33 is a matrix of linear impedances which has an output voltage proportional to the sum of its inputs. Since its two inputs are alternately positive, its output will be a DC voltage of approximately the same amplitude as the peak value of each of the video pulse trains at the outputs of the two gates 27 and 27′. Since the duty cycle in both channels is 50%, the summing of the two channel outputs results in a 6 db enhancement of the signal relative to the individual channel outputs. The output of adder 33 is applied to integrator 15 which in turn operates threshold circuit 17 and thence indicator or alarm 19. The function and circuitry of these last three circuit elements is similar to the corresponding elements of FIGURE 1 in that they reduce the number of false alarms due to random noise.

The circuit of FIGURE 3 will of course pick up pulsed as well as continuous wave signals but the duty cycle of pulsed radar signals is generally rather small so that pulsed signals will generally not produce sufficient energy to operate the threshold circuit 15. If it is desired to completely eliminate the possibility of operation of the indicator by pulsed signals, the video amplifiers can be arranged to saturate (or limit) at the level of the lowest detectable continuous wave signal. Thus any short, high amplitude radar or noise pulses will be limited by the video amplifiers to such an extent that they will not have sufficient energy to charge the integrator to the threshold voltage.

Figure 5:
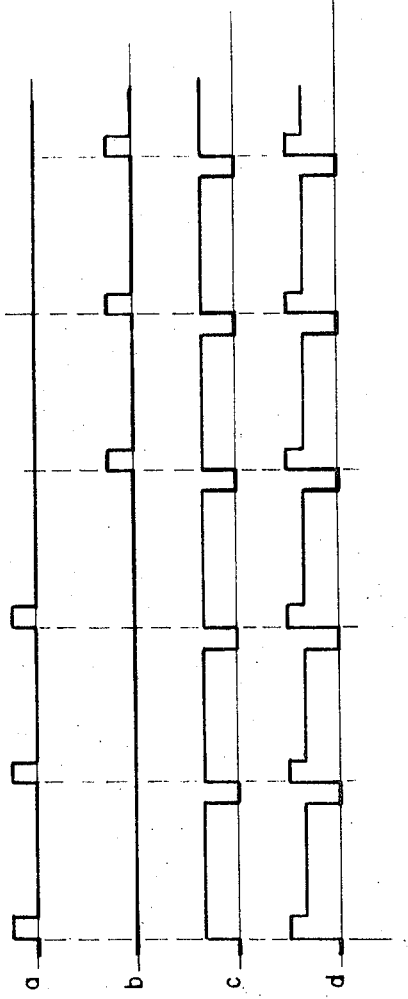
FIGURE 5 illustrates waveforms in different parts of the circuit of FIGURE 4.

The circuit of FIGURE 4 is designed to efficiently respond to both continuous wave and pulsed input signals. The circuit is the same as that of FIGURE 3 up to and including adder 33 except for the inclusion of the attenuator 8, which serves the same function as in FIGURE 1. Connected to the output of adder 33 is a variable pulse length monostable multivibrator 13 which functions in the same manner as the corresponding element of FIGURE 1. The output of adder 33 is also applied to one input of adder 34 via diode 12. The other input of adder 34 is the output of the multivibrator 13. The output of the second adder 34 is applied to integrator 15 which is in turn connected to threshold circuit 15 and thence to indicator 19, as in the other embodiments. The operation of the circuit up to the first adder 33 is the same as that of FIGURE 3. If a continuous wave signal only is picked up by the antenna 7, the output of adder 33 will be a steady positive direct current which will be passed by diode 12 and second adder 34 to the integrator 15 which will function in its usual manner. Since the output of adder 33 is a steady direct current, no pulses will be present at the input of the multivibrator except an occasional noise pulse and hence there will be only occasional triggering thereof by large noise pulses. On the other hand, if pulsed signals are picked up by the antenna, the output of adder 33 will comprise a video pulse train. Each pulse of such a train will then trigger the multivibrator 16, which is adjusted, as in the circuit of FIGURE 1, to produce a pulse almost as long as the interval between the received pulses if this is known or can be estimated. In any event the multivibrator output pulse will be substantially increased in length compared to the video pulses which trigger it. The multivibrator output is applied to a second input of the adder 34 and from the output thereof to the integrator 15. The diode 12 prevents the multivibrator output from being applied to its input via the adder 34. The operation of the circuit when receiving pulsed signals is illustrated by the waveforms of FIGURE 5. The waveform $a$ represents the video pulses in one of the channels of the detector of FIGURE 4, and waveform $b$ the video pulses of the other channel. In this illustration the frequency of generator 29 is such that three radar pulses appear alternately in each of the channels. The first adder 33 will sum the two video pulse trains and each of the six video pulses will trigger the multivibrator. The multivibrator output is shown in waveform $c$. The second adder output, waveform $d$, is the sum of the original video pulse train plus the multivibrator output. Thus is can be seen that energy of the video pulse train has been increased manifold, so that the integrator and the succeeding circuitry can easily respond thereto.

While the invention has been described in connection with illustrative embodiments, many modifications thereof are possible without departing from the inventive concepts disclosed herein. For example, while the invention has been described in connection with a radar signal detector, the disclosed inventive concepts may also be applied to detectors operating in other parts of the electromagnetic spectrum, for instance infrared, visible, X-ray, etc., with suitable changes in the circuitry to accommodate the type of radiation to be detected. Hence the invention should be limited only by the scope of the appended claims.

What is claimed is:

1. An electromagnetic signal detector comprising, a microwave antenna, a crystal detector connected to said antenna and arranged to demodulate microwave energy applied thereto from said antenna, a video amplifier connected to the output of said crystal detector via a direct current blocking capacitor, a monostable multivibrator connected to the output of said video amplifier, an integrator connected to the output of said multivibrator, a threshold circuit connected to the output of said integrator, and an indicator connected to and operated by said threshold circuit.

2. The signal detector of claim 1 wherein said antenna comprises a horn mounted at one end of a waveguide, and wherein said crystal detector is mounted within said waveguide.

3. The signal detector of claim 1 wherein the time constant of said monostable multivibrator is adjustable to provide output pulses of controllable length.

4. The signal detector of claim 1 wherein said microwave antenna comprises a vertically mounted broadbanded dipole.

5. An electromagnetic signal detector comprising a broadbanded, untuned crystal-video receiver comprising a microwave antenna, a crystal demodulator and a video amplifier connected in cascade a pulse generator connected to and operated by the output of said video amplifier, said pulse generator being triggered by video pulses in the output of said video amplifier, said pulse generator being adjusted to produce pulses which substantially fill in the time interval between radar pulses which are to be detected, and means to integrate the output of said pulse generator and to operate a threshold circuit with the integrated output thereof, and an indicator connected to said threshold circuit.

6. An electromagnetic signal detector comprising, a microwave antenna, means to alternately switch the output of said antenna between first and second channels, said means comprising a square wave generator and a microwave switch in each of said channels, a crystal detector connected to the output of each of said microwave switches, a video amplifier connected to the output of each of said crystal detectors, a transmission gate connected to the output of each of said video amplifiers, said transmission gates being opened by the outputs of said square wave generator, means to sum the outputs of said transmission gates, means to integrate the resulting summed output, and means to operate a threshold circuit when the integrated signal reaches a predetermined value, and an indicator connected to said threshold circuit.

7. An electromagnetic signal detector comprising, a microwave antenna, means to alternately switch the output of said antenna between first and second channels, said means comprising a square wave generator and a microwave switch in each of said channels, a crystal detector connected to the output of each of said microwave switches, a video amplifier connected to the output of each of said crystal detectors, a transmission gate connected to the output of each of said video amplifiers, said transmission gates being opened by the outputs of said square wave generator, a first adder having as inputs the outputs of said transmission gates, a monostable multivibrator connected to the output of said first adder, the output of said multivibrator forming one input of a second adder, the output of said first adder being connected to another input of said second adder via a diode, an integrator connected to the output of said second adder, a threshold circuit connected to the output of said integrator, and an indicator connected to said threshold circuit.

References Cited

UNITED STATES PATENTS

| 2,398,490 | 4/1946 | Atwood | 325—324 |
| 3,020,402 | 2/1962 | Brodsky et al. | |
| 3,028,556 | 4/1962 | DuVall | 325—322 |
| 3,366,881 | 1/1968 | Malone et al. | 325—322 |
| 3,374,479 | 3/1968 | Moore. | |

ROBERT L. GRIFFIN, Primary Examiner

ALBERT J. MAYER, Assistant Examiner

U.S. Cl. X.R.

325—323, 324, 325, 341, 364; 343—7, 11, 13 17.1